(12) United States Patent
Devlin et al.

(10) Patent No.: US 10,049,177 B1
(45) Date of Patent: Aug. 14, 2018

(54) CIRCUITS FOR AND METHODS OF REDUCING POWER CONSUMED BY ROUTING CLOCK SIGNALS IN AN INTEGRATED

(71) Applicant: Xilinx, Inc., San Jose, CA (US)

(72) Inventors: Benjamin S. Devlin, San Francisco, CA (US); Ilya K. Ganusov, San Jose, CA (US)

(73) Assignee: XILINX, INC., San Jose, CA (US)

( * ) Notice: Subject to any disclaimer, the term of this patent is extended or adjusted under 35 U.S.C. 154(b) by 319 days.

(21) Appl. No.: 14/792,953

(22) Filed: Jul. 7, 2015

(51) Int. Cl.
*G06F 17/50* (2006.01)

(52) U.S. Cl.
CPC ...... *G06F 17/5077* (2013.01); *G06F 17/5054* (2013.01)

(58) Field of Classification Search
CPC . G06F 17/5077; G06F 17/5054; H03K 5/011; H03K 5/04; H03K 5/12; H03K 5/003; H03K 5/1511; H03K 5/05; H03K 5/06; H03K 5/065; H03K 5/07; H03K 3/017; H03K 5/1565; H03K 7/08
USPC .................................. 716/133; 327/170–175
See application file for complete search history.

(56) References Cited

U.S. PATENT DOCUMENTS

| | | | | |
|---|---|---|---|---|
| 5,589,782 A | * | 12/1996 | Sharpe-Geisler | H03K 3/037 326/38 |
| 6,072,348 A | * | 6/2000 | New | G06F 1/08 327/295 |
| 6,348,825 B1 | * | 2/2002 | Galbi | G01R 31/31721 327/202 |
| 7,979,827 B1 | | 7/2011 | Trimberger et al. | |
| 8,205,180 B1 | | 6/2012 | Anderson et al. | |

* cited by examiner

*Primary Examiner* — Jack Chiang
*Assistant Examiner* — Brandon Bowers
(74) *Attorney, Agent, or Firm* — John J. King

(57) ABSTRACT

A circuit for reducing power consumed by routing clock signals in an integrated circuit is described. The circuit comprises a clock routing network comprising a clock row coupled to receive an input clock signal having a first clock frequency and a plurality of clock branches coupled to the clock row; and a plurality of circuit blocks coupled to the plurality of clock branches, each circuit block having a clock conversion circuit and a register; wherein the clock conversion circuit is programmable to generate clock pulses of an internal clock signal, coupled to the register, having a second frequency that is greater than the first frequency. A method of reducing power consumed by routing clock signals in an integrated circuit is also disclosed.

9 Claims, 14 Drawing Sheets

CIRCUITS FOR AND METHODS OF REDUCING POWER CONSUMED BY ROUTING CLOCK SIGNALS IN AN INTEGRATED

FIELD OF THE INVENTION

The present invention relates generally to integrated circuit devices, and in particular, to circuits for and methods of reducing power consumed by routing clock signals in an integrated circuit.

BACKGROUND OF THE INVENTION

Clock networks are an important part of implementing circuits in integrated circuit devices. Because significant power is consumed by routing clock signals in an integrated circuit, routing a signal at a half clock rate can result in a reduction in power. Further, a clock signal can be altered as it is routed in a clock network of the integrated circuit. For example, duty-cycle distortion (DCD) associated with rising and falling edges of a clock signal occurs due to the difference in rising and falling edge signal propagation in the clock network. There is generally a difference between the strength of a PMOS transistor (used for a 0 to 1 transition) and strength of an NMOS transistor (used for a 1 to 0 transition). This variation is largely due to materials used in the device and physical layout variation. Therefore, a rising edge and a falling edge that is driven from a common node will have different propagation times to the next buffer. The difference between rising and falling edge propagation will accumulate at each stage, creating distortion in the duty cycle of the clock signal.

When using both rising and falling edges to register data using a clock signal for example, there is a time penalty (either positive or negative) between consecutive rising and falling edges as a result of duty-cycle distortion. When only using one clock edge, the duty-cycle distortion can be ignored because the clocking functions are aligned with one edge. But with dual-edge clocking, duty-cycle distortion will add time to odd edge clock skew and subtract time from even edge clock skew, or vice versa, depending on rising/falling delay propagation ratio. As a result, duty-cycle distortion reduces the operating speed of the integrated circuit.

Accordingly, improved circuits for and methods of reducing power consumed by routing clock signals in an integrated circuit are desired.

SUMMARY OF THE INVENTION

A circuit for reducing power consumed by routing clock signals in an integrated circuit is described. The circuit comprises a clock routing network comprising a clock row coupled to receive an input clock signal having a first clock frequency and a plurality of clock branches coupled to the clock row; and a plurality of circuit blocks coupled to the plurality of clock branches. Each circuit block has a clock conversion circuit and a register; wherein the clock conversion circuit is programmable to generate clock pulses of an internal clock signal, coupled to the register, having either the first clock frequency or a second frequency that is greater than the first frequency.

According to another implementation, a circuit for reducing power consumed by routing clock signals in an integrated circuit comprises a clock routing network comprising a clock row coupled to receive an input clock signal having a first clock frequency and a plurality of clock branches coupled to the clock row; and a plurality of circuit blocks coupled to the plurality of clock branches. Each circuit block has a clock conversion circuit and a programmable flip-flop; wherein the clock conversion circuit generates clock pulses of an internal clock signal having a second frequency that is greater than the first frequency; and wherein the programmable flip-flop is configurable to operate as a flip-flop in a first mode and as a latch operating on rising and falling edges of the input clock signal in a second mode.

A method of storing data using dual-edge clocking is also described. The method comprises implementing a clock routing network comprising a clock row coupled to receive an input clock signal having a first clock frequency and a plurality of clock branches coupled to the clock row; coupling a plurality of circuit blocks to the plurality of clock branches, each circuit block having a clock conversion circuit and a register; programming the clock conversion circuit to generate clock pulses of an internal clock signal having either the first clock frequency or a second clock frequency that is greater than the first clock frequency; and generating, by the clock conversion circuit, an internal clock signal having a second frequency that is greater than the first frequency.

Other features will be recognized from consideration of the Detailed Description and the Claims, which follow.

DETAILED DESCRIPTION

The circuits and methods set forth below reduce power consumed by routing clock signals in an integrated circuit, and mitigate the penalty due to duty-cycle distortion when using dual-edge clocking. Dual-edge clocking is used to reduce dynamic power consumed in distributing a clock signal in an integrated circuit by distributing the clock signal at half speed. For example, a half-rate clock signal can be routed in the circuit to reduce power, where data may be latched using both the rising and falling edges of the half-rate clock signal. Further, pulse-controlled registers that trigger on both rising and falling edges can be selectively implemented to reduce the impact of duty-cycle distortion. That is, a time penalty as a result of duty-cycle distortion can be reduced by ensuring that a pulse generated by a pulse-controlled register is sufficient to provide an offset for the duty-cycle distortion. By way of example, a method of mitigating the penalty due to duty-cycle distortion can include identifying duty-cycle distortion in the clock signal at the clock input of a register, and coupling a pulsed output of a pulse generator, rather than the clock signal exhibiting duty-cycle distortion, to a clock input of the register.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
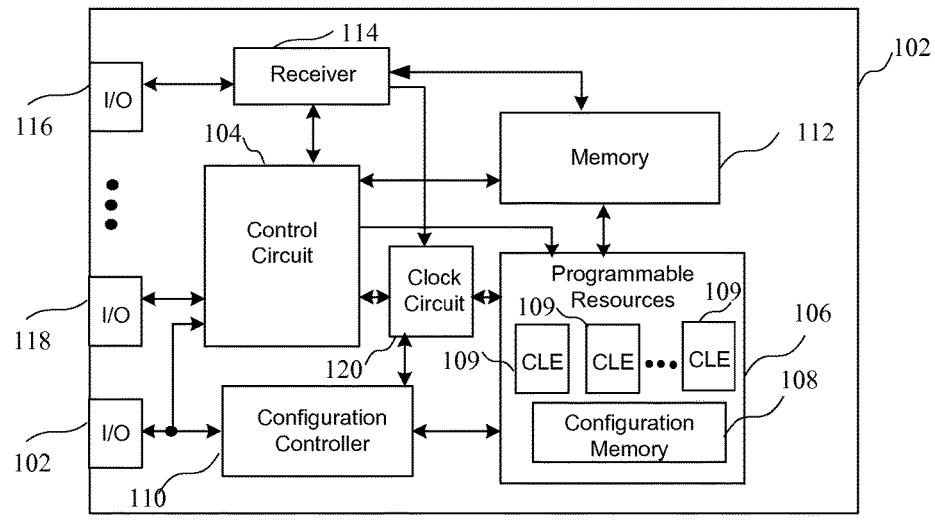
FIG. 1 is a block diagram of an integrated circuit device having programmable resources and implementing dual-edge clocking for routing data.

Turning first to FIG. 1, a block diagram of an integrated circuit device having programmable resources for routing data implementing dual-edge clocking is shown. In particular, an input/output port 102 is coupled to a control circuit 104 that controls programmable resources 106 having configuration memory 108. Configuration data may be provided to the configuration memory 108 by a configuration controller 110. The configuration data enables the operation of configurable logic elements 109. While CLEs are shown by way of example as one type of programmable resources, it should be understood that other programmable resources, such as those described in reference to FIG. 21, could be implemented. A memory 112 may be coupled to the control circuit 104 and the programmable resources 106. A receiver circuit 114 may be coupled to the control circuit 104, programmable resources 106 and the memory 112, and may receive signals external to the integrated circuit device by way of an I/O port 116. Other I/O ports may be coupled to circuits of the integrated circuit device, such as I/O port 118 that is coupled to the control circuit 104 as shown. A clock circuit 120 is coupled to various elements of the circuit of FIG. 1, and may be coupled to a clock network, such as the clock network of FIG. 3. The circuits and methods described in more detail below may be implemented by various elements of the circuit of FIG. 1. Data may be routed using programmable interconnect elements between various circuit elements such as CLE's implemented as lookup tables for example, as will described in reference to FIGS. 2 and 19-21.

Figure 2:
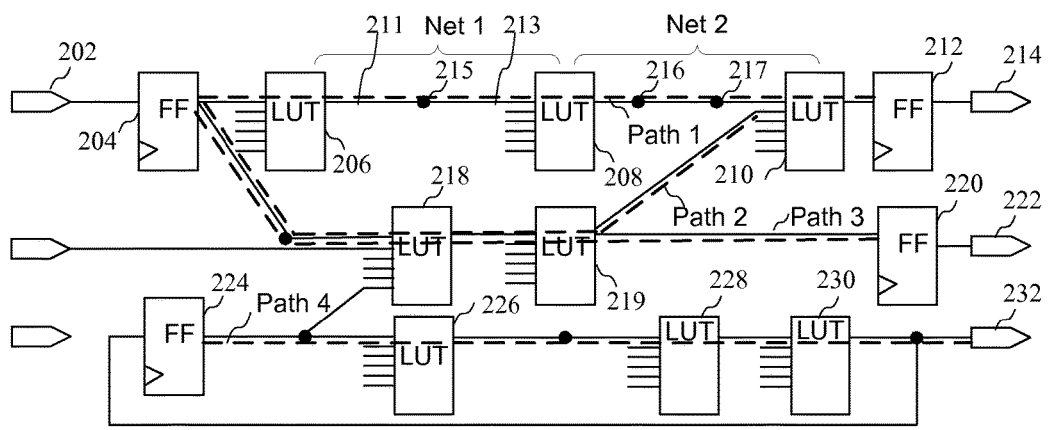
FIG. 2 is a block diagram of a circuit showing the routing of data between programmable resources in an integrated circuit.

Turning now to FIG. 2, a block diagram of a circuit shows the routing of data between programmable resources in an integrated circuit, and more particularly, an example of nets and paths in a device having programmable logic. The timing constraints in a circuit may be based upon nets or paths, for example. A net represents a collection of interconnect lines from the output of a user logic block, such as CLEs as described in FIG. 24, to inputs of the next destination block, while a path represents a sequence of nets between registers comprising a connection from a source to a specific destination. A path may be defined as a clock-to-clock path, such as one register to another register, a register to an output, an input to a register, or an input to an output, as is well known in the art.

Referring specifically to the example of FIG. 2, an input/output (I/O) port 202, which may comprise a primary input, is coupled to an input of a register 204, shown here as a flip-flop, the output of which is coupled to an input of a look up table (LUT) 206. The LUTS of FIG. 2 could be implemented by the configurable logic elements of FIG. 20, for an example. Some inputs of LUTs and FFs in FIG. 2 are shown without nets attached. These nets may connect to other nets, LUTs or FFs, but are not shown for clarity. The output of the LUT 206 is coupled to a second LUT 208, the output of which is coupled to a third LUT 210. The output of the LUT 210 is coupled to a register 212 which is coupled to an I/O port 214. I/O port 214 may comprise a primary output. By way of example, a first path extends from the register 204 to a register 212 by way of LUT 206, LUT 208, and LUT 210. Also shown by way of example, a first net (Net1) is defined between LUT 206 and LUT 208, and comprises one interconnect point 215 connecting two interconnect wire segments 211 and 213. The interconnect point may comprise a programmable interconnect point (PIP), which may be a programmable crossbar switch routing any input of a plurality of inputs to a desired output of a plurality of outputs. The interconnect wire segments and PIPs comprise programmable interconnect elements that enable the connection of LUTs and registers to implement a circuit design.

In contrast, a second net (Net2) extending from the LUT 208 to the LUT 210 comprises two interconnect points 216 and 217 connecting interconnect wire segments. As described above, the connection from the output of one LUT to the input of another LUT may be established by a number of different nets which may comprise different delays and may be selected to comprise a desired delay or meet a minimum delay.

A second path, path 2, between the register 204 and the register 212 is shown extending through LUTs 218 and 219, and back to LUT 210. A third path extends from register 204 through LUTs 218 and 219 to register 220, the output of which is coupled to an I/O port 222. The output of a register 224 is coupled by way of LUTs 226-230 to an I/O port 232, as shown by path 4. A feedback loop is also shown, which would be considered a separate path. Interconnect multiplexers may be used to provide input flexibility between a general interconnect structure and configurable logic elements in FIG. 2 and enable adjusting nets to meet a timing constraints. The LUTs and registers of FIG. 2 can be implemented as parts of CLEs as described in reference to FIG. 24. The example of FIG. 2 is merely provided by way of example to show nets and paths in programmable resources of a programmable logic device. However, it should be understood that the nets may include many additional interconnect segments and interconnect points, while the paths may include many additional LUTs and registers. As should be apparent from FIG. 2, paths selected by placement and routing circuits will affect the timing of data to various registers. As will be described in reference to FIG. 3, a clock signal is routed to enable the registering of data at various locations. Depending upon the timing of data routed through various paths, certain paths may become critical timing paths, and duty-cycle distortion may make the timing in that critical path not feasible.

Figure 3:
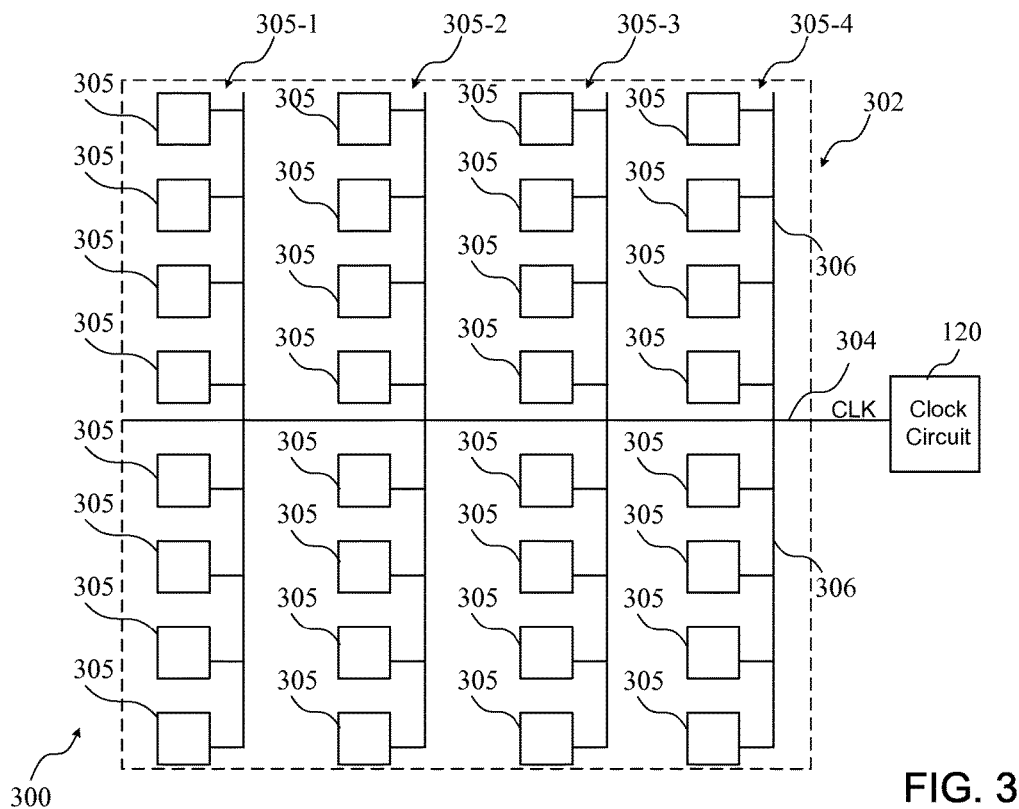
FIG. 3 is a block diagram of a clock network in an integrated circuit.
Figure 4:
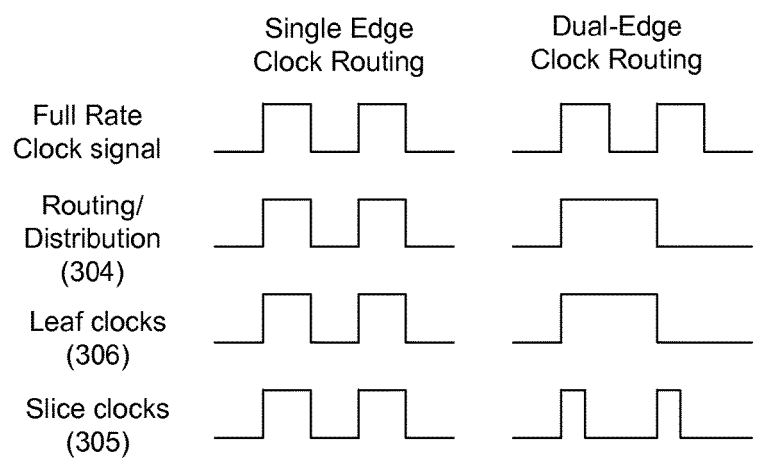
FIG. 4 is a timing diagram showing signals of the clock network of FIG. 3.

Turning now to FIG. 3, a block diagram of a clock network 300 in an integrated circuit is shown. A clock region 302 of the clocking network 300 in a device having programmable resources includes a clock tree that routes clock signals, such as the CLK signal generated by the clock circuit 120. As shown, the clock signal (CLK) first enters the region on one side and travels along a horizontal clock row 304. At the intersection of each column of circuit blocks 305, which may be CLEs shown here in columns 305-1 through 305-4, the clock may be connected using a plurality of vertical clock branches 306 traveling either up and/or down from the horizontal clock row and spanning half of the height of the clock region. It should be noted that the clock region 302 is just a portion of the clock network, and can be distributed throughout an integrated circuit, such as the PLD of FIG. 23 and controlled by the clocking logic 205 for example. Data signals must generally be available at the input of a memory element (such as a memory element functioning as a register of a CLE as shown in FIG. 24), before the clock signal arrives at the memory element. As shown in the timing diagram of FIG. 4, the clock network arrangement of FIG. 3 enables routing a half-rate clock signal through the routing and distribution of the clock network, including the horizontal clock row 304, and the vertical clock branches 306. The clock signals in the vertical clock branches are then multiplied to create a full-rate clock signal. The full-rate clock signal could a slice clock routed to various slices of a CLE, as described in reference to FIG. 24. The full-rate clock signals can be provided as clock pulses, as will be described in more detail below. As further described in more detail below, pulse-controlled registers can be implemented in the circuit blocks 305 to enable the clock signal provided on the vertical clock branches to be provided as clock pulses, or to convert the half-rate clock signal to a full-rate clock signal which is provided as a clock pulses at the frequency of the full rate clock signal.

Figure 5:
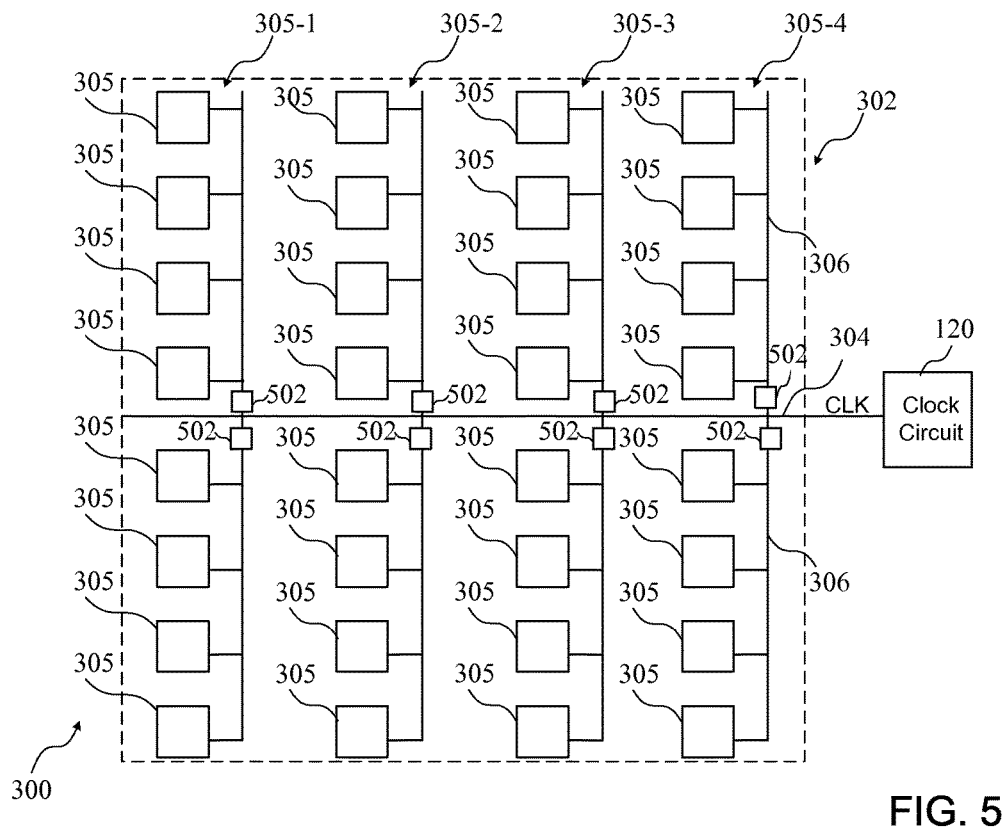
FIG. 5 is another block diagram of a clock network in an integrated circuit.
Figure 6:
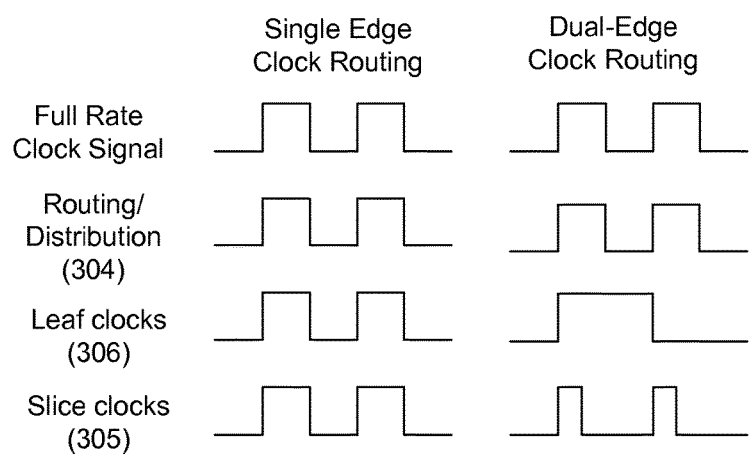
FIG. 6 is a timing diagram showing signals of the clock network of FIG. 5.

Alternatively, the half-rate clock signal routed on the horizontal clock row 304 can be converted to a full-rate clock signal at the vertical clock branches 306 and routed to the circuit blocks 305 as a full-rate clock signal. As shown in FIG. 5, clock divider circuits 502 can be implemented at each clock branch 306. The clock divider circuits can be any conventional clock divider. While clock pulses can be generated at the circuit blocks 305, the pulse generators as described in FIGS. 7, 9, 11 and 13, for example, can be implemented to provide full-rate clock pulses (i.e. clock pulses on both the rising and falling edges of the half-rate clock signal) at the clock divider circuits 502. As shown in the timing diagram of FIG. 6, the full-rate clock is provided on the vertical clock branches 306 and routed to the circuit blocks 305.

Figure 7:
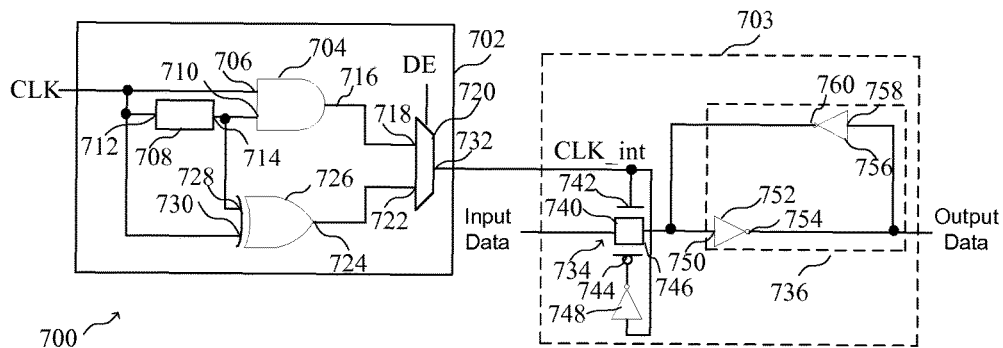
FIG. 7 is a block diagram of pulse-controlled register circuit for registering data using a latch mode.

Turning now to FIG. 7, a block diagram of a pulse-controlled register circuit 700 for registering data using a latch mode is shown. A pulse generator 702 is coupled to a latch circuit 703 comprising a register to correctly register the input data and generate output data in a circuit. The pulse generator 702 comprises an AND gate 704 coupled to receive the clock signal at a first input 706, and receives a delayed clock signal generated by a delay element 708 at a second input 710. The delay circuit 708 comprises an odd number of delay elements so that the delayed clock signal generated at an output 714 is an inverted version of the clock signal. The clock signal is also coupled to an input 712 of the delay element 708, the output 714 of which is coupled to the second input 710. The AND gate 704 and the delay element 708 are provided to generate the pulse to enable latching the data provided to the latch circuit 703 based upon the dual-edge (DE) selection signal coupled to a control terminal of a selection circuit 720. An output 716 of the AND gate 704 is coupled to a first input 718 of the selection circuit 720, shown here as a multiplexer. A second input 722 of the selection circuit 720 is coupled to an output 724 of an XOR gate 726. The XOR gate is coupled to receive the delayed clock signal at the first input 728 and the clock signal at a second input 730. An output 732 of the selection circuit 720 is coupled to control the latch 703. As shown in the timing diagram of FIG. 8, the selected output signal of the pulse generator can be a pulse at each rising edge when the signal at the input 718 of the selection circuit 720 is selected, or a pulse at both the rising and falling edges when the signal at the input 722 is selected. For example, if the output signal at the input 718 is selected, a pulse is generated between times $t_1$ and $t_2$, $t_5$ and $t_6$, and $t_9$ and $t_{10}$. Pulses between times $t_3$ and $t_4$, and $t_7$ and $t_8$ will also be generated if the output signal at the input 722 is selected.

The latch 703 comprises a pass gate 734 receiving the input data, shown here by way of example as having a pair of CMOS transistors, and is controlled by the output of the selection circuit 720 at a gate 742 of the transistor 740, and by an inverted output of the selection circuit 720 at a gate 744 of a transistor 746, where the inverted output is generated by the inverter 748 and the gates 742 and 744 are clock inputs of the latch 703. The input data will be latched by the latch circuit 703 when the CLK_int pulse transitions low.

Figure 8:
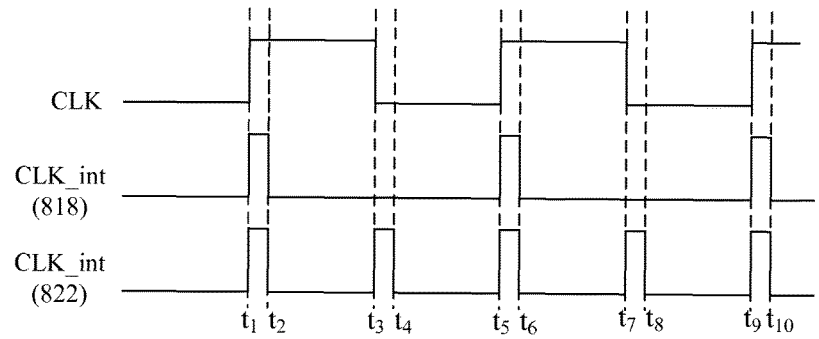
FIG. 8 is a timing diagram showing the operation of the circuit of FIG. 7.

A latch element 736 is coupled to the pass gate 734, and comprises a pair of cross-coupled inverters. The input data passed by the pass gate 734 is coupled to an input 750 of an inverter 752, and output 754 of which comprises the output data and is coupled to an inverter 756 at an input 758. An output 760 of the inverter 756 is coupled to an input 750 of the inverter 752. The pulse-controlled register with optional dual-edge mode of FIG. 7 allows the latch to operate in dual-edge mode by adding an XOR gate to generate pulses on both rising and falling edges of the clock as shown in FIG. 8. Dynamic/static power is also reduced inside the latch because the delay line used can be shared between both the XOR and AND gates to reduce area overhead.

Figure 9:
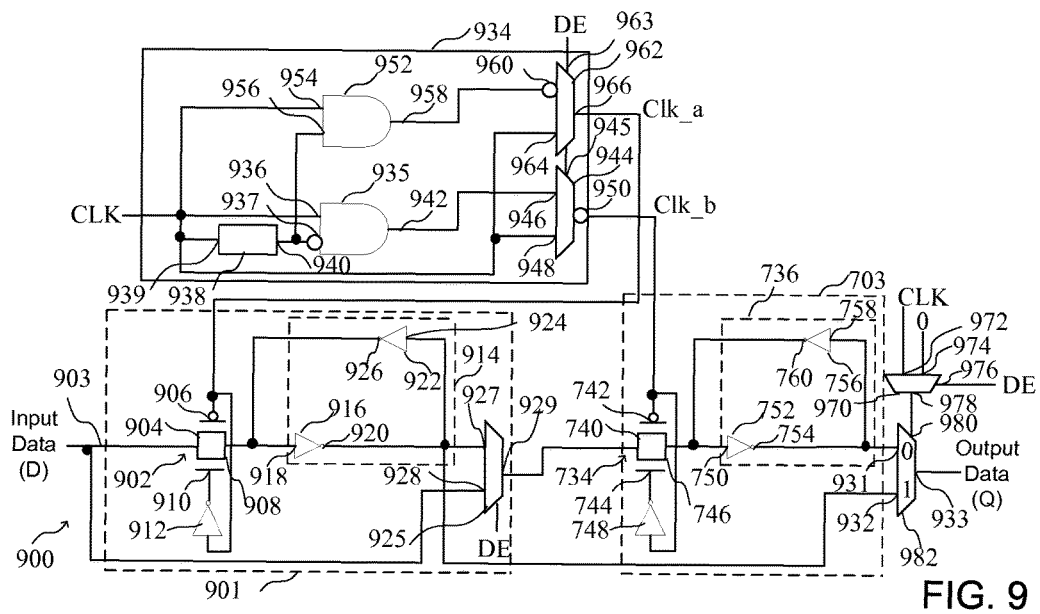
FIG. 9 is a block diagram of a pulse-controlled register circuit for registering data using a latch mode or flip-flop mode.

Turning now to FIG. 9, a block diagram of a pulse-controlled latch circuit 900 for registering data using a dual latch mode is shown. In addition to the latch 703, which is coupled to receive a clock signal designated Clk_b, a second latch 901 is coupled to the latch 703 and controlled by a clock signal designated Clk_a to form a flip-flop. In particular, a pass gate 902 comprises a first transistor 904 coupled to receive the clock signal Clk_b at a gate 906, and a second transistor 908 coupled to receive an inverted clock signal based upon Clk_b at a gate 910 by way of an inverter 912. The input data is routed to an input 903 of the second latch 901 comprising latch element 914 having a pair of cross-coupled inverters. The input data passed by the pass gate 902 is coupled to an input 918 of an inverter 916, and output 920 of which is coupled to an inverter 922 at an input 924. An output 926 of the inverter 922 is coupled to the input 918. The output 920 is coupled to a selection circuit 925 at first input 927, where the input data is coupled to a second input 928. An output 929 of the selection circuit 925 is coupled to the pass gate 734. Output data is generated at an output 933 of a selection circuit 982 coupled to receive an output (i.e. output 754) of the latch circuit 703 at a first input 931 and an output of the latch circuit 901 at an input 932.

The pass gates 902 and 734 are controlled by a control circuit 934 having an AND gate 935 coupled to receive the clock signal at an input 936 and a delayed clock signal at an inverted input 937 by way of a delay element 938 receiving the clock signal at an input 939 and generating the delayed clock signal at an output 940. An output 942 of the AND gate 935 is coupled to a selection circuit 944 at a first input 946 and the clock signal is coupled to an input 948. The inverted Clk_b signal is generated at an output 950. An AND gate 952 is coupled to receive the clock signal at an input 954 and a delayed clock signal at an input 956. An output 958 is coupled to an inverted input 960 of a selection circuit 962. The clock signal is also coupled to an input 964, where the Clk_a signal is generated at an output 966. The selection circuits 944 and 962 are controlled by the DE signal at control inputs 945 and 963, respectively. As shown in the timing diagram of FIG. 10, the Clk_a and Clk_b signals are inverted clock pulses generated on the rising and falling edges, respectively, of the clock pulse when in the dual-edge (DE) mode, and correspond to the clock signal and inverted clock signal, respectively, when not in the DE mode.

The flip-flop circuit of FIG. 9 with dual-latch mode is a programmable latch circuit that allows for the input to be directly connected to the slave latch (i.e. latch circuit 703), so it can operate like a latch, but with the option for it to still be used as a flip-flop. That is, the circuit of FIG. 9 can be implemented to function as a flip-flop, or pass the data through the latch 901 and operate latch circuit 703 as a pulse-controlled latch. As selection circuit 970 is coupled to receive the clock signal at a first input 972 and logical "0" at an input 974. The logical zero is selected by the DE signal to select the first input 931 as the output data. That is, during normal operation of the circuit of FIG. 9, the output of the latch circuit 703 will always be select as the output data, and the circuit of FIG. 9 will operate as a flip-flop. When dual-edge operation is selected, the clock signal at the input 972 is selected, and therefore alternately selecting, using the control terminal 976, the outputs of the latch circuit 703 and the latch circuit 901 as the output data at an output 978 which is coupled to the control terminal 980 of the selection circuit 982.

Figure 10:
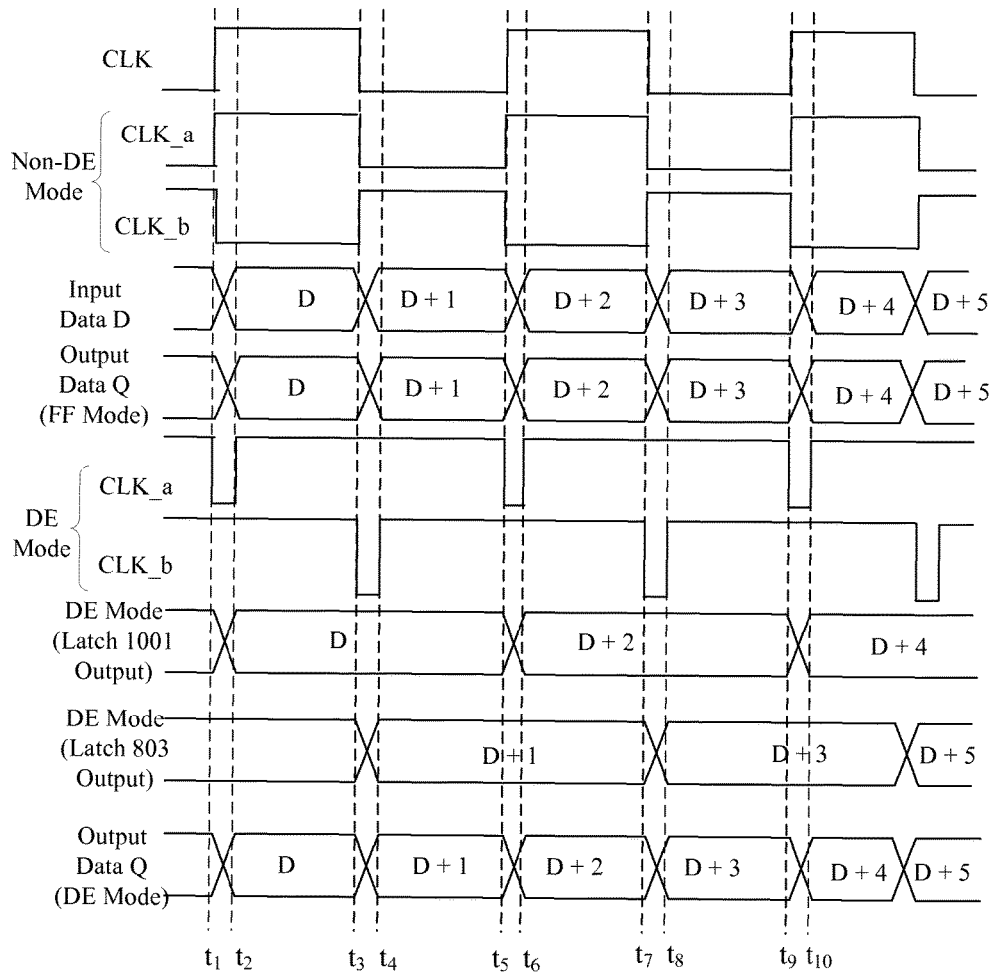
FIG. 10 is a timing diagram showing the operation of the circuit of FIG. 9.

The circuit of FIG. 9 can also be programmed to be used as two individual latches by providing a separate output pin between the two latches. When the dual-edge (DE) mode is enabled by selecting the pulsed outputs for CLK_a and CLK_b, a single flip-flop is used as if it were 2 latches, but only storing 1 bit of data in each latch per clock pulse. The left/right side of the flip-flop that is written to depends on the rising/falling edge of the clock, so it operates like a latch and can be used to help correct DCD. If DE mode is disabled and the CLK and inverted CLK signals are selected for CLK_a and CLK_b, respectively, then the circuit of FIG. 9 operates as a flip-flop. Accordingly, the circuit of FIG. 9 allows with minimal change to implement either a flip-flop or a latch, but has the benefit of implementing 2 latches. As shown in FIG. 10, the data can be received at twice the clock rate in the flip-flop mode, or two data streams (at the outputs of latches 703 and 901) can be received at the clock rate in the DE mode by switching between the outputs of the latches 703 and 901.

Figure 11:
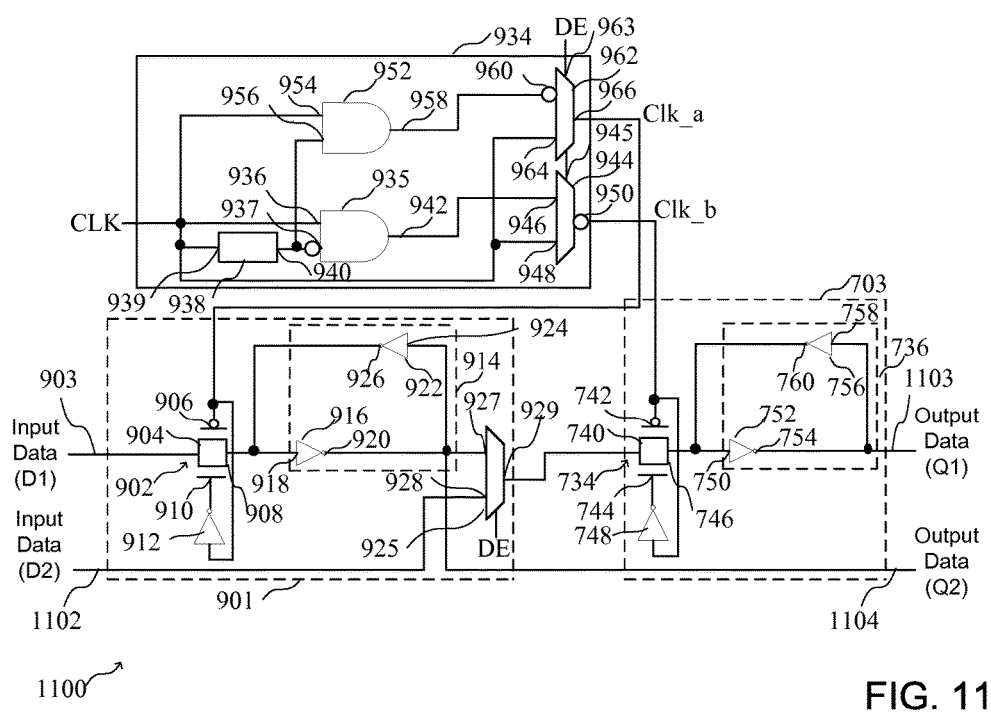
FIG. 11 is a block diagram of another pulse-controlled register circuit for registering data using a latch mode or a flip-flop mode.
Figure 12:
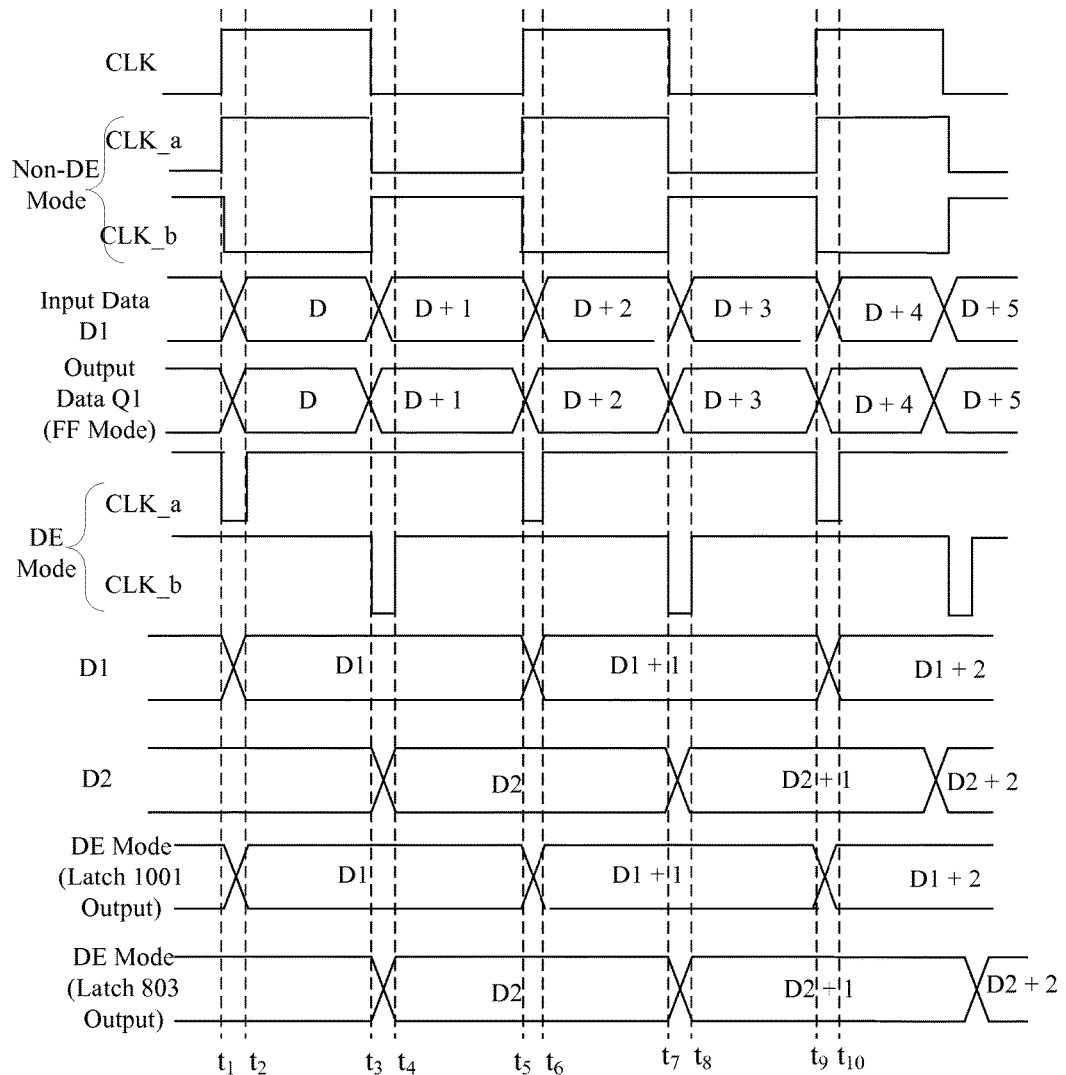
FIG. 12 is a timing diagram showing the operation of the circuit of FIG. 11.

The pulse-controlled register circuit 1100 of FIG. 11 is another programmable latch and enables the independent use of the two latches of the flip flop by providing separate inputs and outputs to the two latches. In particular, an input 1102 is provide to the input 928 of the selection circuit 925. When DE is enabled in the circuit of FIG. 11 with separate inputs and outputs, the flip flop can be used as 2 latches, and store 2 different data values on the rising and falling edges. When DE is disabled, the circuit is used as a flip flop (where the Q2 output is ignored). Therefore, the circuit provides the benefit of pulse-latch operation for helping DCD by enabling storing data from 2 locations (odd and even cycles of the clock take input from D1 or D2), and enabling reverting to flip-flop operation. The circuit of FIG. 11 is beneficial in the case of interleaving data on odd and even clock cycles because it is easy to merge or split data using this circuit. As shown in FIG. 12, the input data can be received at twice the clock rate in the flip-flop mode, or two separate data streams can be independently received at the clock rate by using separate inputs (i.e. 903 and 1102) and outputs (i.e. 1103 and 1104) for the two latches 703 and 901.

In addition to enabling the correction of duty-cycle distortion by implementing pulse generators, it should be noted that the circuits of FIGS. 7, 9 and 11 also enable reduction of power by enabling latching data on both rising and falling edges of a clock signal. That is, the pulse generators function as clock conversion circuits, where the latches are registers coupled to latch data on both the rising and falling edges of the clock signal. More particularly, the pulse generator 702 of FIG. 7 functions as a clock conversion circuit that is programmable to generate an internal clock signal having a frequency that is greater than the frequency of the clock signal that is provided to the pulse generator. That is, as shown in FIG. 8, the internal clock signal generated at the output of the exclusive OR gate 726 comprises pulses generated at twice the frequency of the clock signal that is provided to a latch circuit. Similarly, the control circuit 934 of FIGS. 9 and 11 functions as a clock conversion circuit that is programmable to generate an internal clock signal (such as CLK_a or CLK_b) having a frequency that is greater than the frequency of the clock signal provided to the pulse generator, and more particularly twice the frequency.

However, flip-flop circuits can also be implemented as the register to enable storing data on both the rising and falling edges of the clock signal, and therefore enable the routing of a half-rate clock signal through the clock network to circuit elements, and then convert the generated clock signal to clock pulses at twice the frequency of the clock signal. The flip-flop based circuits of FIGS. 13, 14 and 16 enable reducing power in integrated circuit by allowing a half-rate clock signal to be routed to circuit blocks, such as each circuit block 305 of FIG. 3 for example. The half-rate clock signal can then be converted to clock pulses at twice the frequency of the clock signal (i.e. on the rising and falling edges of the half-rate clock signal, and therefore reduce power consumed by routing clock signals in the integrated circuit by only having to route the half-rate clock signal in the clock row and the clock branches.

Figure 13:
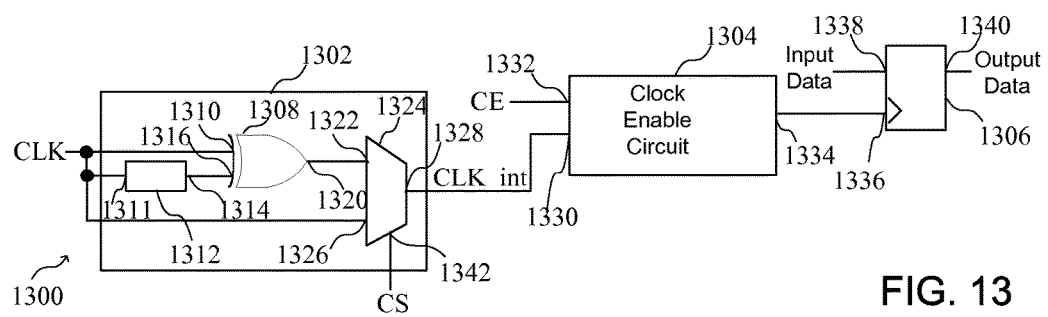
FIG. 13 is a block diagram of flip-flop based pulse controlled register circuit.

Turning now to FIG. 13, a block diagram of circuit having a register and a pulse generator is shown. A pulse-controlled register 1300 comprises a pulse generator 1302 coupled to a clock enable circuit 1304 that provides a signal to a clock input of a flip-flop 1306. The pulse generator 1302 comprises an XOR gate 1308 coupled to receive a clock signal at a first input 1310 and delayed clock signal. That is, the clock signal is also coupled to an input 1311 of a delay element 1312, an output 1314 of which is coupled to a second input 1316. An output 1320 of the XOR gate 1308 is coupled to an input 1322 of a selection circuit 1324, shown here as a multiplexer. A second input 1326 of the selection circuit 1324 is coupled to receive the clock signal. An output 1328 of the selection circuit 1324 is coupled to an input 1330 of the clock enable circuit 1304, which is also coupled to receive a clock enable (CE) signal at a second input 1332. The clock enable circuit 1304 enables passing of the clock signal or a clock pulse at an output 1334 to a clock input 1336 of the flip-flop 1306. The flip-flop 1306 stores the input data at an input 1338 based upon a signal received at the clock input 1336, and provides the registered data at an output 1340. Accordingly, the pulse-controlled register 1300 comprises a flip-flop based register for generating a pulse having a rising edge or falling edge at a predetermined location and therefore enables generating clock pulse at twice the frequency of the input clock signal. An example of a circuit implementing the flip-flop having a first latch 901 and a second latch 703 is shown in detail in FIG. 9.

Figure 20:
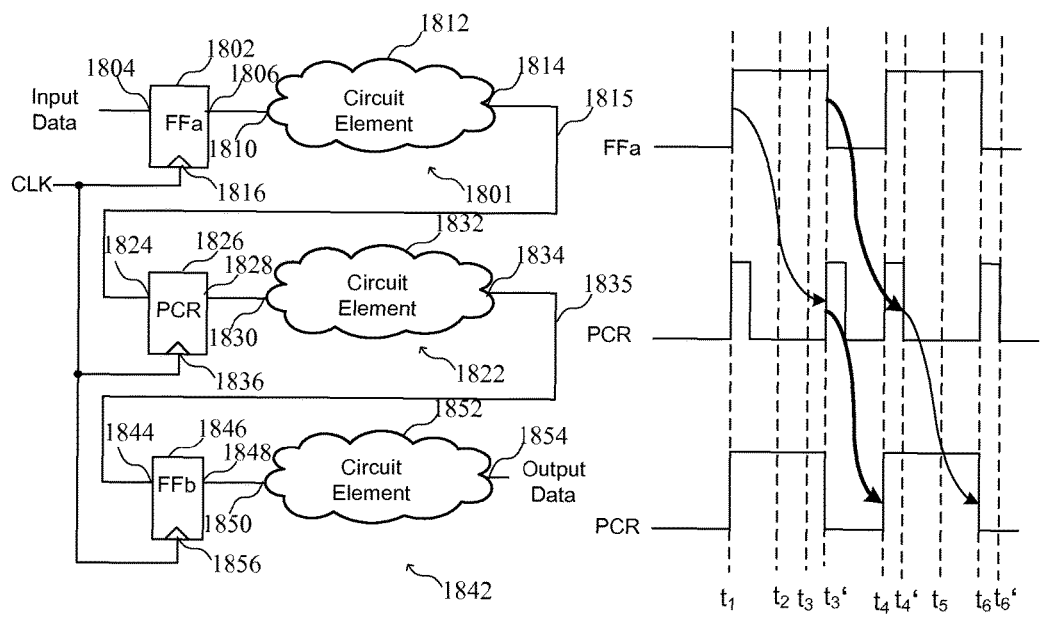
FIG. 20 is a block diagram of a circuit showing the registering of data having positive duty-cycle distortion.

The pulse-controlled register 1300 can be programmed, using a control signal (CS) at an input 1342, to pass the clock signal to the clock enable circuit 1304 and therefore operate as a normal flip-flop, or to provide a pulse, such as the pulse having a falling edge generated at time $t_3$ as shown below in FIG. 18 or the pulse generated at the time $t_3$ as shown in FIG. 20. The delay element can be a series of inverters for example, where a tap output of the inverter is selected to provide the appropriate delay to generate the pulse. The delay element and the XOR gate will generate pulses for every transition on the clock signal, allowing the circuit to operate on dual-edges with minimum change. The selection circuit 1324 placed after the pulse generator enables the duel edge operation to be bypassed. It should be noted that the pulse generators of the circuit of FIGS. 7, 9, 11 and 13 can be used for a plurality of registers. For example, as described in reference to FIG. 24, each of the memory elements of a CLE could be coupled to receive the clock pulses generated by a pulse generator.

Figure 14:
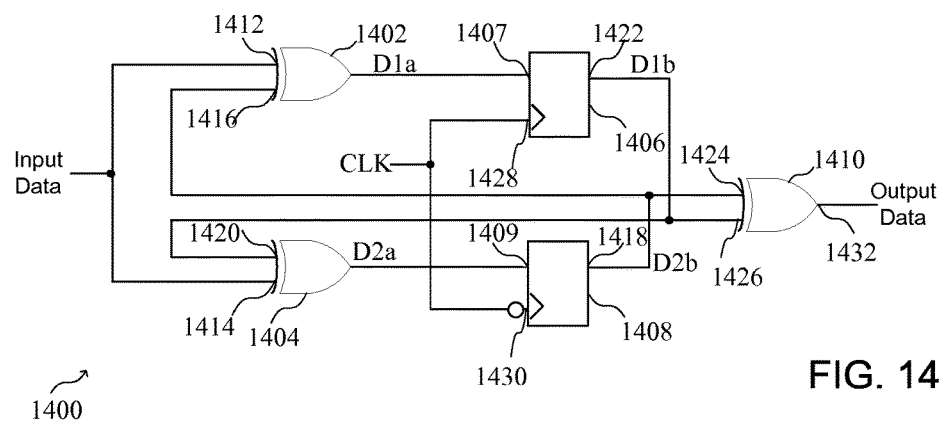
FIG. 14 is a block diagram of a register circuit having flip-flops.

Turning first to FIG. 14, a block diagram of a dual flip-flop circuit 1400 enabling dual edge clocking having reduced power is shown. A first XOR gate 1402 and a second XOR gate 1404 are coupled to receive input data, and the outputs are coupled to a corresponding flip-flop 1406 at an input 1407 and flip-flop 1408 at an input 1409. Outputs of the flip-flops are coupled to inputs of an XOR gate 1410. In particular, the XOR gate 1402 is coupled to receive the input data at a first input 1412 and the XOR gate 1404 is coupled to receive the input data at a second input 1414. An output of the flip-flop 1406 is coupled to the input 1420, while an output of the flip-flop 1408 is coupled to an input 1416 of the XOR gate 1402. An output 1418 of the flip-flop 1408 is coupled to an input 1424 of the XOR gate 1410 and an output 1422 is coupled to an input 1426, and output of which is generated at an output 1432. The clock signal is received at the input 1428 of the flip-flop 1406 and an inverted input 1430 of the flip-flop 1408.

Figure 15:
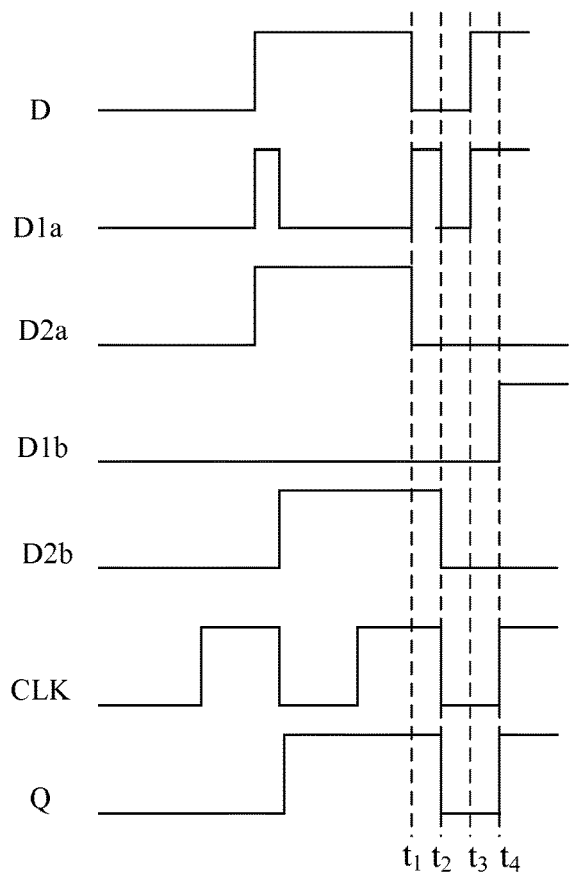
FIG. 15 is a timing showing the operation of the circuit of FIG. 14.

While the overhead of the circuit of FIG. 14 is minimal (i.e. the addition of 2:1 multiplexer), it requires 2 flip-flops each time it is used. If the number of flip-flops available in an integrated circuit is not limited, then this circuit would be helpful in reducing power when implementing dual-edge clocking. Alternatively, it may be possible to take advantage of unused flip-flops if the architecture allows for such connections, without having to increase the number of flip-flops. Therefore, while the circuit of FIG. 14 doubles the number of flip-flops required to store 1 bit, and uses 3 XOR gates to control internal clock signals so that each one is toggled in turn, it allows for a half-speed clock to be connected directly to the flip-flop clock pins, allowing for greater power savings compared to some implementations using a pulse generator. The operation of the circuit of FIG. 14 is shown in the timing diagram of FIG. 15. The exclusive OR gates operate so that changes in the input data D compared to the output of the previous stage will make the output toggle, where the falling edge of the output data at time $t_2$ follows the falling edge of the input data at time $t_1$ and the rising edge of the output data at time $t_4$ follows the rising edge of the output data at time $t_3$.

Figure 16:
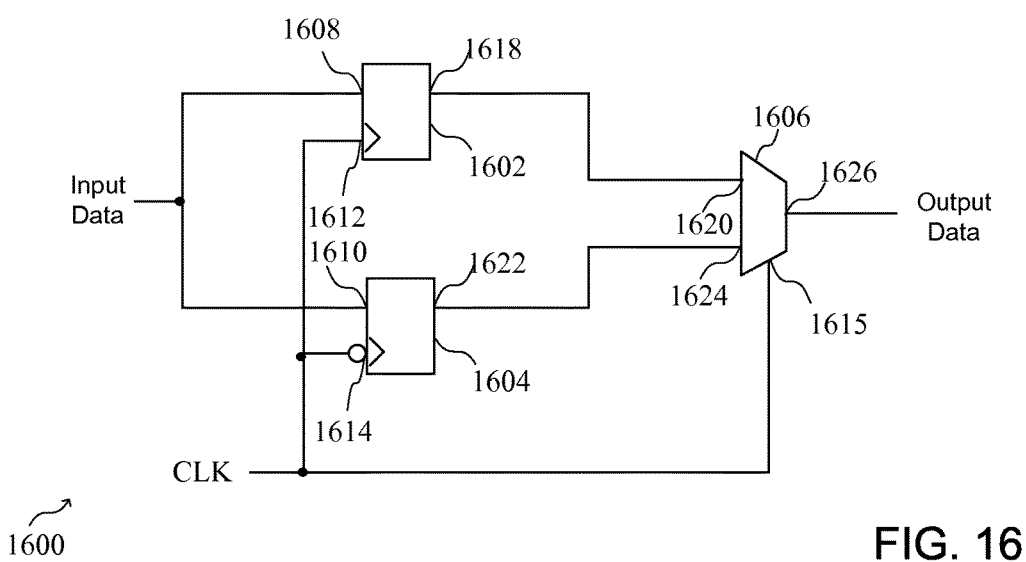
FIG. 16 is a block diagram of another register circuit having flip-flops.

Turning now to FIG. 16, another block diagram of a dual flip-flop circuit 1600 enabling dual-edge clocking having reduced power is shown. The dual flip-flop circuit comprises a first flip-flop 1602 and a second flip-flop 1604, outputs of which are coupled to a selection circuit 1606, shown here as a multiplexer. The clock signal is also coupled to clock input 1612 and inverted clock input 1614, as well as a control terminal 1615 of the selection circuit 1606. An output 1618 of the flip-flop 1602 is coupled to an input 1620 of the selection circuit 1606 and an output 1622 of the flip-flop 1604 is coupled to an input 1624 of the selection circuit 1606, an output of which is generated at an output 1626.

It should be noted that the implementation of FIG. 16 is similar to FIG. 14 except the data input is connected between both flip-flops, the clock is inverted to the second flip-flop, and the output is selected by a 2:1 multiplexer. Accordingly, the circuit of FIG. 16 has both less area and power overhead compared to the implementation of FIG. 14, but requires more careful planning on connecting the clock to the selection input of the multiplexer to prevent glitches. Further, a delay line may be required to match the delay of the flip-flop, slightly increasing delay through this circuit.

Figure 17:
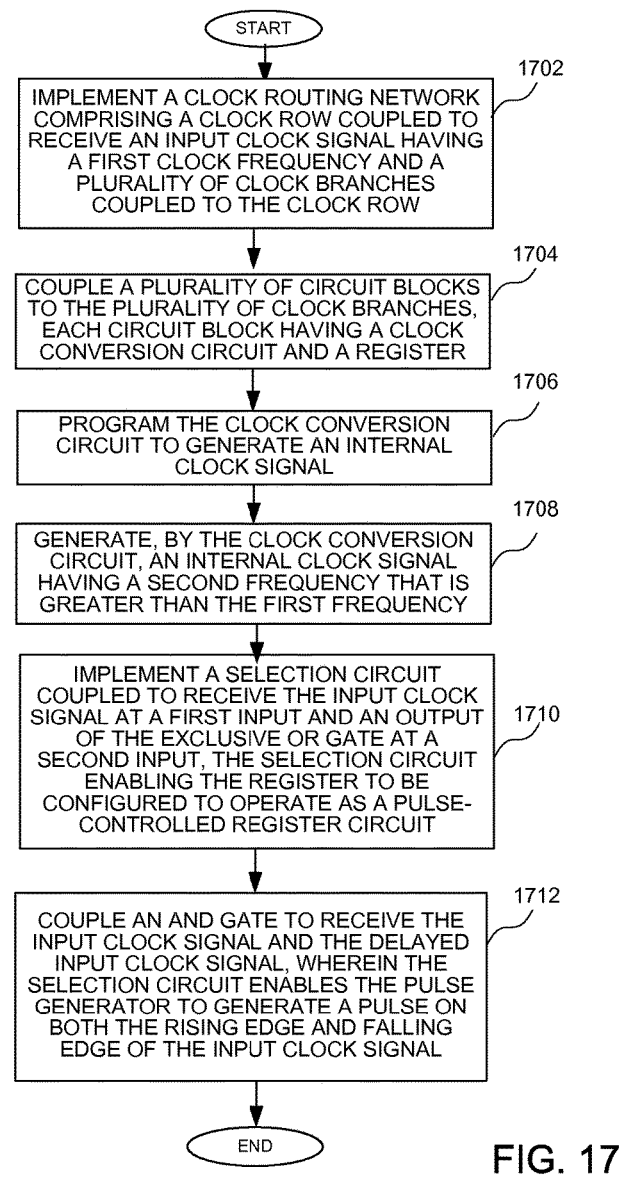
FIG. 17 is a flow chart showing a method of reducing power consumed by routing clock signals in an integrated circuit device.

Turning now to FIG. 17, a flow chart shows a circuit for reducing power consumed by routing clock signals in an integrated circuit. In particular, a clock routing network comprising a clock row coupled to receive an input clock signal having a first clock frequency and a plurality of clock branches coupled to the clock row is implemented at a block 1702. The clock network could be clock network 300 of FIG. 3, for example. A plurality of circuit blocks are coupled to the plurality of clock branches, each circuit block having a clock conversion circuit and a register at a block 1704. The clock conversion circuit and register could be implemented as shown and described in reference to FIGS. 7, 9, 11, and 13 for example. The clock conversion circuit is programmed to generate an internal clock signal at a block 1706. A selection circuit coupled to receive the input clock signal at a first input and an output of an exclusive OR gate, such as exclusive OR gate 726 of FIG. 7 or exclusive OR gate 1308 of FIG. 13, at a second input is implemented at a block 1708, wherein the selection circuit enabled the register to be configured to operate as a pulse-controlled register circuit. An AND gate, such as AND gate 704 of FIG. 7, may also be coupled to receive the input clock signal and the delayed input clock signal at a block 1710, wherein the selection circuit enables the pulse generator to generate a pulse on both the rising edge and falling edge of the input clock signal. An internal clock signal having a second frequency that is greater than the first frequency is generated, by the clock conversion circuit, at a block 1712.

The various elements of the method of FIG. 17 may be implemented using the circuits of FIGS. 1-16 and 21-24 as described, or using some other suitable circuits. While specific elements of the method are described, it should be understood that additional elements of the method, or additional details related to the elements, could be implemented according to the disclosure of FIGS. 1-16 and 21-24.

Figure 18:
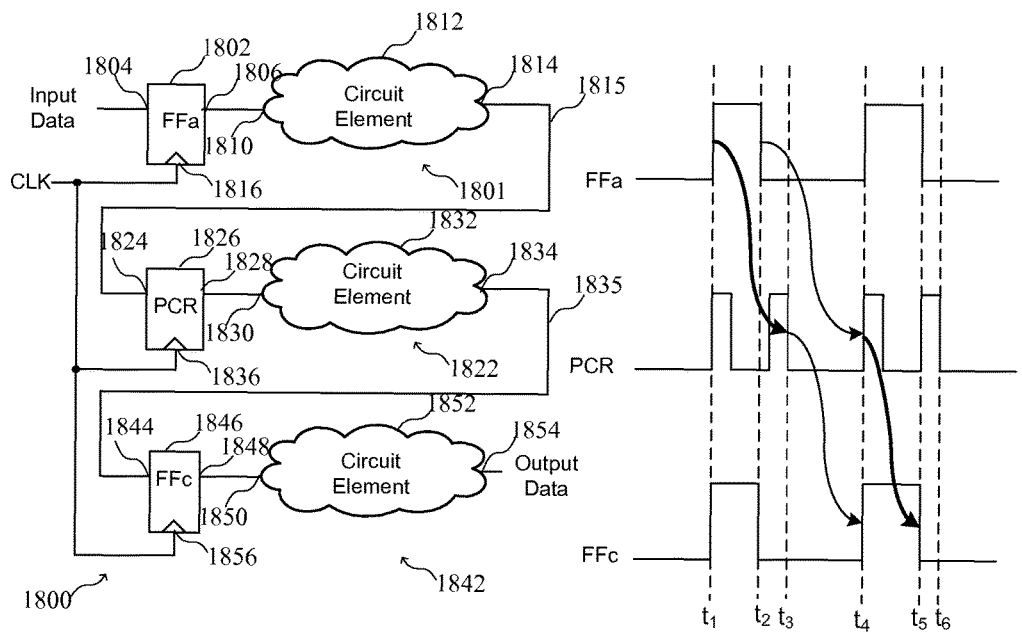
FIG. 18 is a block diagram of a circuit showing the registering of data having negative duty-cycle distortion.

Turning now to FIG. 18, a block diagram of a circuit shows the registering of data having negative duty-cycle distortion. A circuit 1800 comprises a plurality of register circuits associated with circuit elements, where the register elements may receive either a clock signal or a pulse signal depending upon whether the register element is implemented as a flip-flop or a pulse controlled register circuit. The circuit elements could use any number of LUTS coupled together by interconnect segments and interconnect points as described above in reference to FIG. 2, and a clock signal could be routed to the registers (as well as the circuit elements) as described in reference FIG. 3. A first register 1802, shown here as a flip-flop, is coupled to receive input data at a data input 1804. The input data could be data provided to the integrated circuit at an input/output port of the integrated circuit or could be an output of some other circuit element, including the various programmable resources described in reference to FIGS. 23 and 24. An output 1806 of the first register 1804 is coupled to an input 1810 of a circuit element 1812, which could be a LUT or a group of LUTs for example. An output 1814 of the circuit element 1812 of a first stage 1801 of the circuit 1800 is coupled to a second stage 1822 by programmable interconnect elements 1815 comprising a data path. That is, the output 1814 is coupled to a data input 1824 of a second register 1826, shown here as a pulse-controlled register (PCR). The clock signal is coupled to a clock input 1816.

A particular register circuit can be implemented as a pulse controlled register, such as a pulse-controlled latch, based upon a determination that a clock signal received at a clock input of the register circuit exhibits duty-cycle distortion. That is, rather than routing the clock signal to a register of the register circuit to store the data, a pulsed output of a pulse generator of the register circuit will be coupled to a clock input of the register to compensate for the duty-cycle distortion, and particularly a pulse controlled register circuit is implemented in a path where the duty-cycle distortion may result in incorrect data being registered.

As described in more detail above in reference to FIGS. 7-12, pulse-controlled register circuits receive the clock signal and provide a pulse signal to a clock input of a register of the pulse-controlled register circuit to compensate for any duty-cycle distortion of the clock signal received at the pulse-controlled register circuit.

An output 1828 of the register circuit 1826 is coupled to an input 1830 of the circuit element 1832. An output 1834 of the second stage is coupled to a third stage 1842 by programmable interconnect elements 1835 comprising a data path, and particularly a data input 1844 of a third register 1846, wherein an output 1848 is coupled to an input 1850 of a circuit element 1852 having an output 1854 for generating output data. A clock input 1856 receives the clock signal. While three stages are shown by way of example, it should be understood that the arrangement of circuit elements, register circuits, and programmable interconnect elements that enable the routing of data could include many more circuit elements and register circuits. Three stages are shown to provide examples of how pulse controlled register circuits can be selectively placed among conventional registers, such as flip-flops for example, and selectively placed at predetermined locations in critical paths determined to receive a clock signal exhibiting duty-cycle distortion.

The three timing diagrams of FIG. 18 show the clock signal used by the registers of the corresponding stages. When one clock edge is used as in a conventional approach, duty-cycle distortion can be ignored because all clocking functions are aligned with a single clock edge (i.e. rising or falling clock edge). But with dual-edge clocking, duty-cycle distortion will add time to the odd edge clock portion and subtract time from the even edge clock portion (or vice versa, depending on rising/falling delay propagation ratio). Dynamic power consumed in a clock network can be expressed by Pdynamic=$CV^2f$, where C is the capacitance, V is the voltage, and f is the switching frequency. In conventional devices, the clock network is routed across a large network with many loads and therefore has a large capacitance, but registers operate only on one edge, where the other edge is wasted. By operating registers on both rising and falling edges, it is possible to distribute a clock at half frequency, with the data rate unaffected because the data is received in the registers at the full frequency (i.e, twice the half frequency of the routed clock signal by using both the rising and falling edges of the clock signal). Pdynamic due to clock would be reduced by half, or close to half, depending if there is any change in capacitance C. However, duty-cycle distortion will result in the selection of a clock at greater than the half speed in order to compensate for the cycle having a reduced pulse width.

The effect of duty-cycle distortion and the significance of implementing a pulse-controlled register is described in reference to the timing diagrams next to the stages of FIG. 18. The clock signal (CLK) received at the first register 1802 has a rising edge at time $t_1$ and a falling edge at a time $t_2$. Because the falling edge of the clock signal coupled to the first register 1802 would normally be at time $t_3$ (i.e. for a circuit not having duty-cycle distortion and therefore exhibiting a 50 percent duty cycle), the clock signal received at the first register 1802 exhibits duty-cycle distortion, where the falling edge of the clock signal arrives early at time $t_2$. Because the falling edge of the clock signal is used to register data from the circuit element 1812, the falling edge of the clock signal would arrive early at the input 1836. Such an situation would require a slower clock to ensure that the signal to be registered by the second register 1826 is received at the data input 1824 at the time that the falling edge clock signal is received at the clock input 1836. Therefore, rather than implementing a conventional register, such as a flip-flop, a pulse-controlled register is used, wherein the signal used to register the data is delayed by a pulse generator to generate a pulse signal having a falling edge as shown at time $t_3$ in FIG. 18. That is, without the pulse-controlled register, the falling edge of the clock signal used by the second register 1826 to register the data would be at time $t_2$. By implementing the pulse-controller register circuit, the falling edge of the pulse can be selectively placed at time $t_3$ to ensure that the correct data is registered by the register 1826 implemented as a latch. As will be described in more detail below, the amount of delay provided by the pulse generator to create the falling edge at the correct location can be determined through circuit simulation of a desired circuit design or through testing of fabricated integrated circuits implementing the desired circuit design.

It should be noted that the rising edge of the clock signal at time $t_4$ is at the correct time. That is, duty-cycle distortion changes the percentage of a clock signal associated with a high signal compared to a percentage of a clock signal associated with a low signal. While the period of the clock signal (i.e. between a rising edge and a rising edge for example) does not change, the portions of the period associated with the high and low signals are no longer equal. Therefore, the rising edge of the clock signal coupled to the second register 1826 is received at the correct time. However, because of the duty-cycle distortion, the falling edge of the clock signal used to register the data at the output 1834 of the second stage 1822 by the third register 1846 occurs at a time $t_5$, rather than the correct time $t_6$ if there were no duty-cycle distortion. Accordingly, a pulse-controlled register could be implemented for the third register 1846. If it is determined that the path is not critical and there should be no timing issue with the data arriving in time for the correct data to be registered, a flip-flop could be implemented as register 1846, as shown in FIG. 18.

Figure 19:
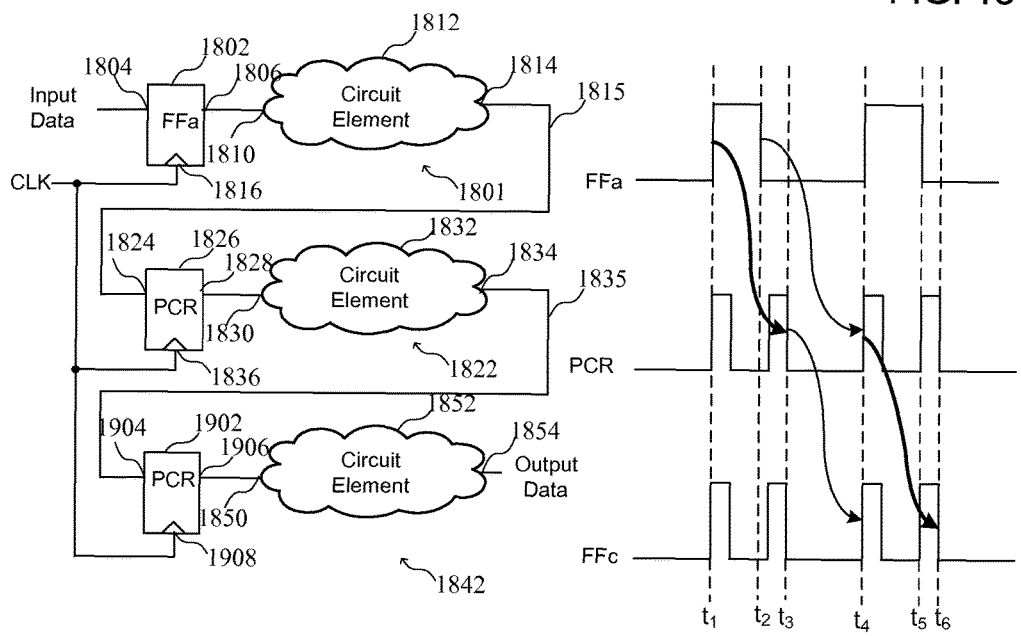
FIG. 19 is a block diagram of another circuit showing the registering of data having negative duty-cycle distortion.

However, if it is determined that the path from the second register 1826 to the third register 1846 is critical and that it would be necessary to compensate for the duty-cycle distortion by moving the falling edge of a clock signal, the third register 1846 could be implemented as a pulse controlled register, as shown in FIG. 19. That is, the pulse-controlled register 1802 receives data at an input 1806 and receives the clock signal at a clock input 1808. Accordingly, the falling edge of the clock signal used for registering data correctly falls at time $t_6$, rather than early at time $t_5$ as shown in FIG. 19

Therefore, taking duty-cycle distortion into account is an important aspect of correctly determining whether a pulse-controlled register should be implemented at a certain location. While clock conversion circuits for enabling dual edge clocking can be implemented in circuit block 305, pulse-controlled registers that reduce the impact of duty-cycle distortion may be implemented to pre-determined locations, as will be described in more detail below. As is apparent in the routing structure of FIG. 3, clock signals routed on the clock tree will exhibit skew, and therefore must also be taken into account. For example, a clock signal transition will generally arrive at a flip-flop closer to a horizontal clock row than a flip-flop farther from the horizontal clock row. However, the timing of the routing of clock signals to flip-flops would depend on detailed device characterization data. The timing requirements for data routed in various circuit elements will determine whether a certain path is a critical path, and therefore whether a pulse-controlled register should be implemented to store data output by a circuit element.

Because duty-cycle distortion is mostly created in the clock routing and distribution, it may be necessary to distribute a normal-frequency clock (which may be a half-rate clock) in a conventional clock network, and only change to a dual-edge clock at the leaf level (i.e. at the logic block 305). By selectively implementing to pulse-controlled register, it is possible implement a dual-edge at a leaf level for maximum power savings, which may result in extra total power savings. Further, main challenges to implementing such a data routing system include the area/power overhead of circuits that can operate on both rising and falling clock edges, as well as timing penalty introduced due to duty-cycle distortion. By selectively implementing pulse-controlled register circuits, any increase in area/power overhead is kept to a minimum while correcting duty-cycle distortion (and therefore minimizing the frequency of the clock signal). Further, because pulse generators are implemented to provide a pulse at an appropriate location to provide a fifty percent duty cycle of the clock signal, a half-frequency clock signal can be routed in the clock row and clock branches and data can be received at the full frequency by using both rising edges and falling edges of the clock signal.

Figure 21:
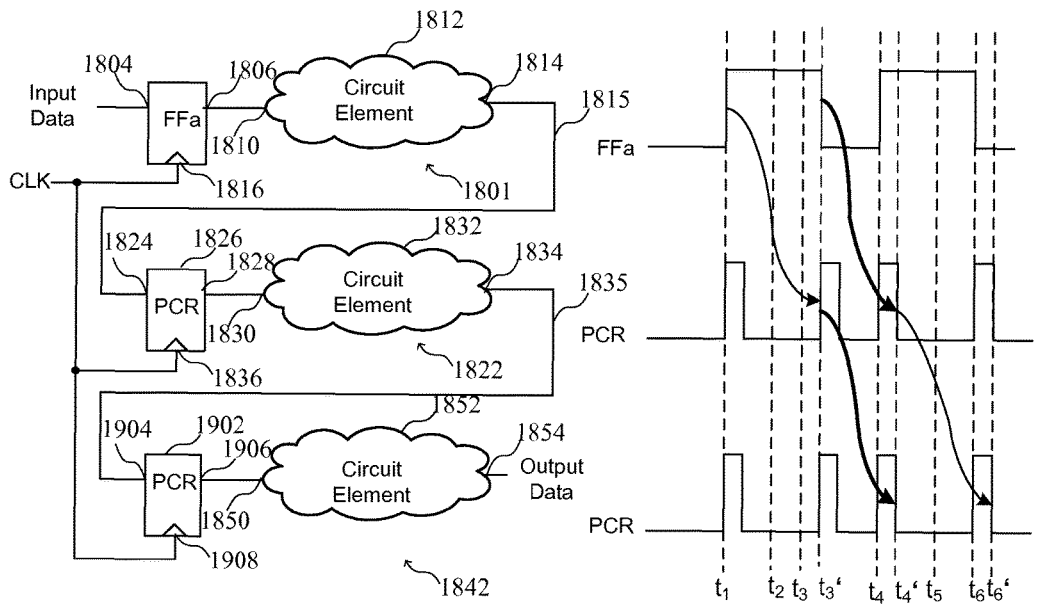
FIG. 21 is a block diagram of another circuit showing the registering of data having positive duty-cycle distortion.

FIGS. 20 and 21 show a situation where the duty-cycle distortion results in the portion of the clock signal that is high being greater than 50 percent of the clock period and the portion of the clock signal that is low being less than 50 percent of the clock period (i.e. positive duty-cycle distortion). As shown in FIG. 20, which implements a pulse-controlled register circuit for the register 1826, the falling edge of the clock signal received at the register 1802 occurs at a time $t_3'$, after the time $t_3$ where the clock pulse would otherwise have a 50/50 duty cycle. That is, the period between the late falling edge at time $t_3'$ and the rising edge at time $t_4$ is short. Therefore, the register 1826 is implemented as a pulse-controlled latch to enable the falling edge of the pulse used to register data by register 1826 to occur at time $t_4'$. Accordingly, the time period between time $t_3'$ and time $t_4'$ is one half of a clock cycle, and the correct data is received when the falling edge pulse for registering the data is received at time $t_4'$. If the path between the output of the register 1826 and the data input 1844 of the register 1846 is a critical path and the data may not arrive at the data input 1844 in time to be registered at time $t_6$, the register 1846 can be implemented as a pulse-controlled register 1802 as shown in FIG. 21. Accordingly, the falling edge of the pulse signal used to register the data occurs at the time $t_6'$. Therefore, as described above, pulse controlled latches can be selectively placed, based upon timing information for data paths associated with circuit elements, to ensure that the clock signal or pulse provided by a pulse generator used to register data occurs at the correct time.

Therefore, a clock can be distributed at half frequency through the routing and distribution networks in a conventional circuit, and multiplied by 2 at the point where it enters the circuit blocks 305. Therefore, a lower rate clock (i.e. half-rate clock signal) can be routed through the clock branches 306 of FIG. 3, and the data is received at the circuit block 305 at a full rate by using both the rising and falling edges of the clock signal. It should be noted that the clock signal on the horizontal clock row 304 could be a full-rate clock signal that is divided at the vertical clock branches 306. A pulse-controlled register is then used with the half-rate clock signal and triggered on the rising and falling edges of the half-rate clock signal. That is, because the effects of duty cycle distortion increases the longer the half-rate clock signal is routed in the clock network, it may be beneficial to convert the half-rate clock signal farther along in the clock network. However, converting the clock signal to a half-rate clock signal farther along in the clock network is at the expense of power savings. That is, it takes more power to route the full-rate clock signal, as set forth above. For example, if the time penalty is 160 ps in the fast-min corner for an integrated circuit having 20 nanometer (20 nm) transistors, a significant performance impact degradation of approximately 7% on a 500 MHz critical path can occur. While the use of pulse-controlled register can reduce the total dynamic power savings from 4% to 3%, the DCD penalty is reduced to only 10's of picoseconds. Hold is not impacted as hold is checked off the same edge, but setup is impacted because consecutive edges have differing arrival times (i.e. odd cycles have less time and even cycles have more time). Considering a static timing analysis (STA), the worst case situation should be evaluated, where the odd cycle has reduced arrival time by a certain number "x" of picoseconds (ps). Considering a path being the worst critical path (with more delta than "x" ps to the next critical path), with clock period of 2 ns and exactly meeting requirements, an old frequency would be 1/(2*10−9)=500 Mz, with 160 ps of duty-cycle distortion, whereas a new frequency would be 1/(2.160*10−9)=463 MHz. Therefore, the new frequency has degraded 7.4% due to 160 ps of duty-cycle distortion.

In order to mitigate this degradation due to duty-cycle distortion, a subset of flip-flops is converted into pulse-controlled registers, where latches are combined with pulse generators for example. Converting to latches provides an effective solution because of the operation of the latches. That is, during the period that the clock signal is high, the latch is open, allowing the input value to propagate to the output. When the clock is low (i.e. on the falling edge of the CLK_int pulse), the output value is latched and its value is held. The data value propagating from a flip-flop (e.g. register 1802) to a latch (e.g. register 1826) now does not have to arrive by the edge shifted to the left by the duty-cycle distortion. Rather, it can arrive as long as the pulse generated is high, where a programmable delay allows for delay values equal to the expected value of duty-cycle distortion.

It should be noted that using pulse-controlled registers to correct duty-cycle distortion relies on different timing characteristics than conventional time borrowing. In a duty-cycle distortion situation, pulse-controlled registers enable fixing dynamic timing imbalance between odd and even cycles, while conventional time borrowing relies on static slack imbalance between sequential pipeline stages. As a result, using pulsed latches to fix duty-cycle distortion does not decrease additional performance gains possible with time borrowing.

The penalty that the circuits and methods may cause (which is true for any design using latches) is that hold time is increased by the pulse width amount, as the data value must be constant for the pulse width, rather than getting stored on the rising edge as is the case when using a flip-flop to store data. In order to evaluate the effect of the increase in hold times, a benchmark on 135 designs was run and all hold paths were made worse by 200 ps. A hold router that attempts to fix hold violations by taking longer routes was run to show that this penalty can be mitigated. Before the hold router, the average worst negative hold slack was −202 ps, and average worst negative setup slack was −967 ps. After running the hold router, the average worst negative hold slack was −5 ps, and the average worst negative setup slack was −1013 ps, or 46 ps worse, which resulting in an approximate 1% maximum frequency (Fmax) degradation on average.

Other advantages that dual-edge clocking brings, in addition to halving dynamic clock power, include reducing switching noise as a result of less IR drop on other circuits, reducing external on-board oscillator power (on the order of 100's of mW), and reducing jitter in the clock signal fed into the IC (because the external oscillator has a slower slew rate due to lower frequency). Because clock power accounts for 16% of total chip core dynamic power of an IC (which includes all programmable logic—LUTs, DSPs, BRAM, and interconnect—and excludes I/O and PS), such a power reduction of approximately half of the clock power is significant, and any additional power requirement for implementing pulse-controlled latch circuits is small compared to power reductions as a result of routing a clock signal at one-half frequency in the clocking network.

It should be noted that while the use of pulse-controlled registers increases area overhead, the increase is not significant but leads to a significant power reduction. In using a 16 nm transistor layout from a programmable delay circuit to estimate the area overhead of having a 4-inverter delay line, an XOR gate, and a 2:1 multiplexer, the pulse-controlled register circuit can generate a pulse width of 65 to 92 ps, depending on the corner (i.e. min and max). The increased area required to implement in all CLE blocks (with a granularity of 4 dual-edge flip-flops per pulse generator circuit) is approximately 0.247%. This overhead would be halved if the circuit was implemented with a granularity of 8 flip-flops per pulse generator circuit.

It should be further noted that delay due to increased setup and hold of the pulse generator circuit is small. In this circuit, in the slow-max corner the clock to the output path gets additional 19 ps delay. Setup becomes 19 ps better for input to these flip-flops, but for flip-flops to other block (e.g. DSP, BRAM, etc) connections, an extra 19 ps is added to data path delay. In the fast-min corner, the clock path gets additional 14.5 ps delay and hold becomes 14.5 ps worse. Based upon these setup/hold changes in tested designs, it was determined that the impact to the overall Fmax was a 0.14% degradation.

Figure 22:
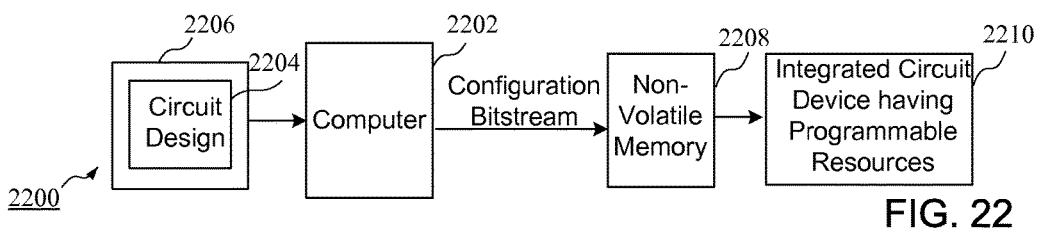
FIG. 22 is a block diagram of a system for programming a device having programmable resources.

Turning now to FIG. 22, a block diagram of a system for programming a device having programmable resources according to an embodiment is shown. In particular, a computer 2202 is coupled to receive a circuit design 2204 from a memory 2206, and generates a configuration bitstream that is stored in the non-volatile memory 2206. As will be described in more detail below, the circuit design may be a high level design, such as a circuit design defined in a hardware description language (HDL). Also, the computer may be configured to run software that generates a configuration bitstream that is stored in the non-volatile memory 2208 and provided to an integrated circuit 2210 that may be a programmable integrated circuit, such as the integrated circuit described below in FIG. 23. As will be described in more detail below, bits of the configuration bitstream are used to configure programmable resources of the integrated circuit.

Figure 23:
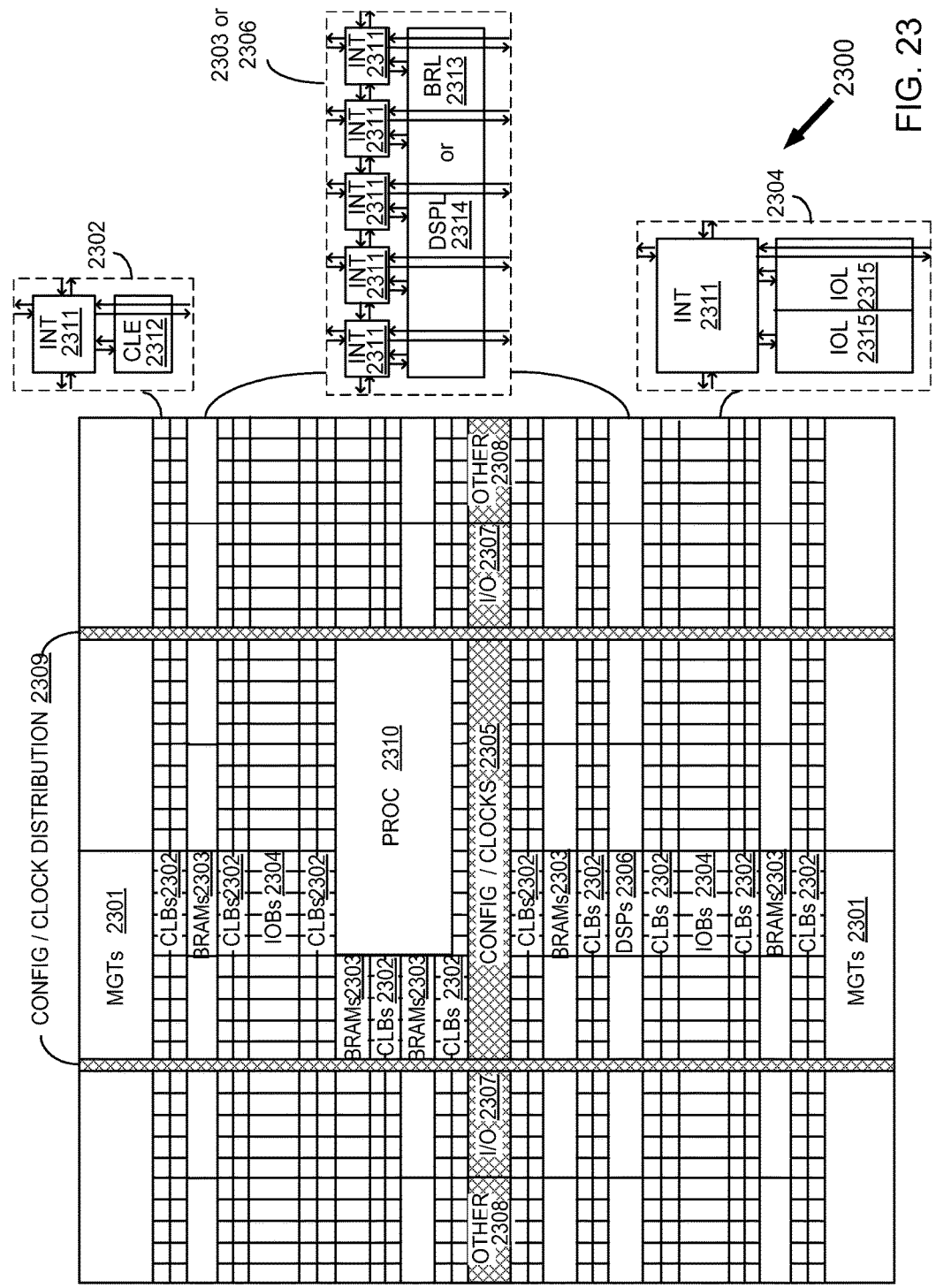
FIG. 23 is a block diagram of a device having programmable resources.
Figure 24:
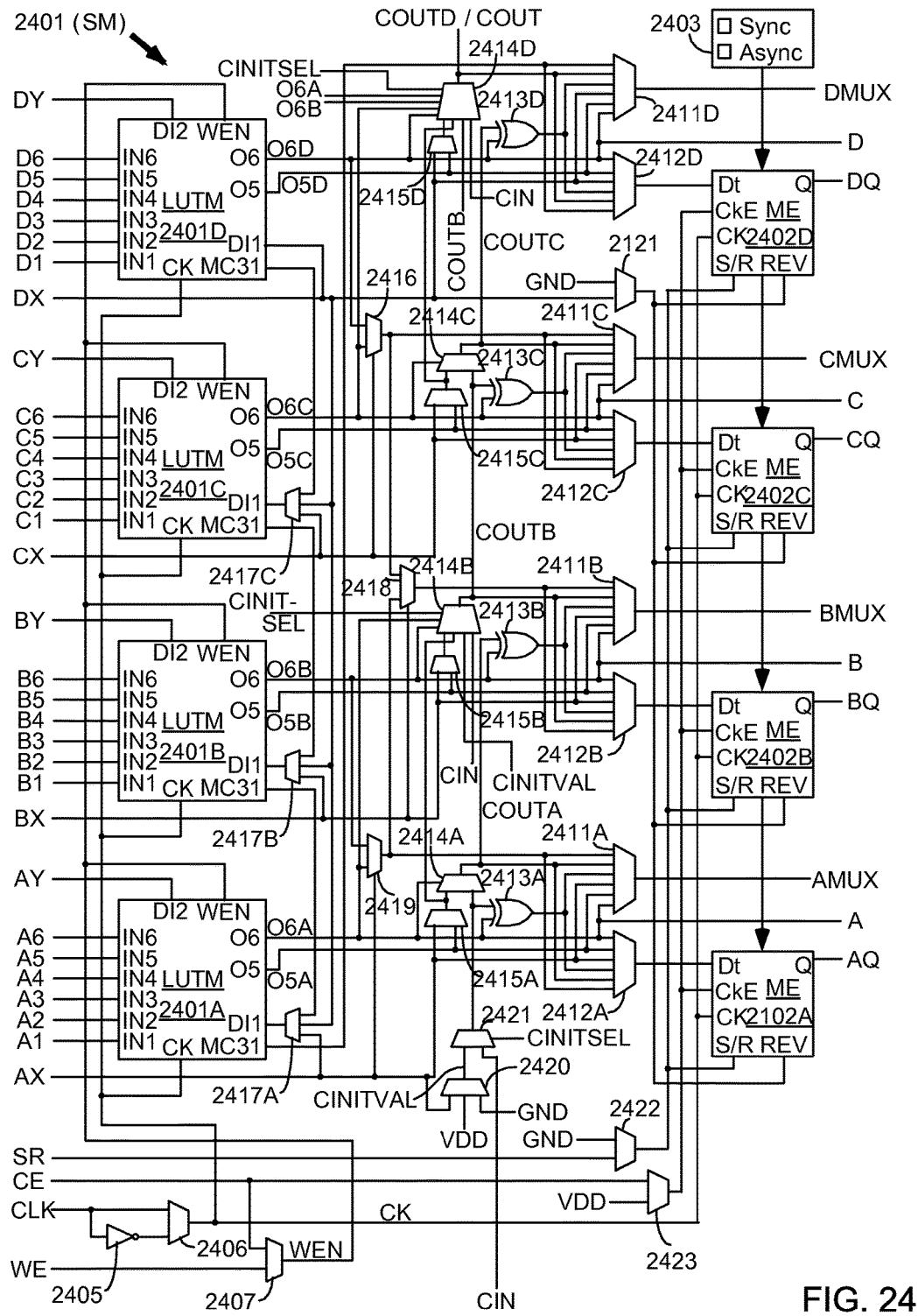
FIG. 24 is a block diagram of a configurable logic element of the device of FIG. 23.

Turning now to FIG. 23, a block diagram of a device having programmable resources including the circuits of FIGS. 1-21 is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 23 comprises an FPGA architecture 2300 having a large number of different programmable tiles including multi-gigabit transceivers (MGTs) 2301, CLBs 2302, random access memory blocks (BRAMs) 2303, input/output blocks (IOBs) 2304, configuration and clocking logic (CONFIG/CLOCKS) 2305, digital signal processing blocks (DSPs) 2306, specialized input/output blocks (I/O) 2307 (e.g., configuration ports and clock ports), and other programmable logic 2308 such as digital clock managers, analog-to-digital converters, system monitoring logic, and so forth. Some FPGAs also include dedicated processor blocks (PROC) 2310, which may be used to implement a software application, for example.

In some FPGAs, each programmable tile includes a programmable interconnect element (INT) 2311 having standardized connections to and from a corresponding interconnect element in each adjacent tile. Therefore, the programmable interconnect elements taken together implement the programmable interconnect structure for the illustrated FPGA. The programmable interconnect element 2311 also includes the connections to and from the programmable logic element within the same tile, as shown by the examples included at the top of FIG. 23.

For example, a CLB 2302 may include a configurable logic element (CLE) 2312 that may be programmed to implement user logic plus a single programmable interconnect element 2311. A BRAM 2303 may include a BRAM logic element (BRL) 2313 in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as five CLBs, but other numbers may also be used. A DSP tile 2306 may include a DSP logic element (DSPL) 2314 in addition to an appropriate number of programmable interconnect elements. An IOB 2304 may include, for example, two instances of an input/output logic element (IOL) 2315 in addition to one instance of the programmable interconnect element 2311. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die is used for configuration, clock, and other control logic. The config/clock distribution regions 2309 extending from this column are used to distribute the clocks and configuration signals across the breadth of the FPGA. Some FPGAs utilizing the architecture illustrated in FIG. 23 include additional logic blocks that disrupt the regular columnar structure making up a large part of the FPGA. The additional logic blocks may be programmable blocks and/or dedicated logic. For example, the processor block PROC 2310 shown in FIG. 23 spans several columns of CLBs and BRAMs.

Note that FIG. 23 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 23 are purely exemplary. For example, in an actual FPGA more than one adjacent column of CLBs is typically included wherever the CLBs appear in order to facilitate the efficient implementation of user logic. While the embodiment of FIG. 23 relates to an integrated circuit having programmable resources, it should be understood that the circuits and methods set forth in more detail below could be implemented in any type of ASIC.

Turning now to FIG. 24, block diagram of a configurable logic element of the device of FIG. 23 is shown. In particular, FIG. 24 illustrates in simplified form a configurable logic element of a configuration logic block 2302 of FIG. 23. In the embodiment of FIG. 24, slice M 2401 includes four lookup tables (LUTMs) 2401A-2401D, each driven by six LUT data input terminals A1-A6, B1-B6, C1-C6, and D1-D6 and each providing two LUT output signals O5 and O6. The O6 output terminals from LUTs 2401A-2401D drive slice output terminals A-D, respectively. The LUT data input signals are supplied by the FPGA interconnect structure via input multiplexers, which may be implemented by programmable interconnect element 2411, and the LUT output signals are also supplied to the interconnect structure. Slice M also includes: output select multiplexers 2411A-2411D driving output terminals AMUX-DMUX; multiplexers 2412A-2412D driving the data input terminals of memory elements 2402A-2402D; combinational multiplexers 2416, 2418, and 2419; bounce multiplexer circuits 2422-2423; a circuit represented by inverter 2405 and multiplexer 2406 (which together provide an optional inversion on the input clock path); and carry logic having multiplexers 2414A-2414D, 2415A-2415D, 2420-2421 and exclusive OR gates 2413A-2413D. All of these elements are coupled together as shown in FIG. 24. Where select inputs are not shown for the multiplexers illustrated in FIG. 24, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 24 for clarity, as well as from other selected figures herein.

In the pictured embodiment, each memory element 2402A-2402D may be programmed to function as a synchronous or asynchronous flip-flop or latch. The selection between synchronous and asynchronous functionality is made for all four memory elements in a slice by programming Sync/Asynch selection circuit 2403. When a memory element is programmed so that the S/R (set/reset) input signal provides a set function, the REV input terminal provides the reset function. When the memory element is programmed so that the S/R input signal provides a reset function, the REV input terminal provides the set function. Memory elements 2402A-2402D are clocked by a clock signal CK, which may be provided by a global clock network or by the interconnect structure, for example. Such programmable memory elements are well known in the art of FPGA design. Each memory element 2402A-2402D provides a registered output signal AQ-DQ to the interconnect structure. Because each LUT 2401A-2401D provides two output signals, O5 and O6, the LUT may be configured to function as two 5-input LUTs with five shared input signals (IN1-IN5), or as one 6-input LUT having input signals IN1-IN6.

In the embodiment of FIG. 24, each LUTM 2401A-2401D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 2417A-2417C for LUTs 2401A-2401C), or to the two 32-bit RAMs via input terminals DI1 and DI2. RAM write operations in the LUT RAMs are controlled by clock signal CK from multiplexer 2406 and by write enable signal WEN from multiplexer 2407, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 2401A may also be provided to the general interconnect structure for shift register chaining, via output select multiplexer 2411D and CLE output terminal DMUX. Accordingly, the circuits and methods set forth above may be implemented in a device such as the devices of FIGS. 23 and 24, or any other suitable device.

It can therefore be appreciated that new circuits for and methods of reducing power consumed in routing clock signals in an integrated circuit has been described. It will be appreciated by those skilled in the art that numerous alternatives and equivalents will be seen to exist that incorporate the disclosed invention. As a result, the invention is not to be limited by the foregoing embodiments, but only by the following claims.

We claim:

1. A circuit for reducing power consumed by routing clock signals in an integrated circuit, the circuit comprising:
   a clock routing network comprising a clock row coupled to receive an input clock signal having a first clock frequency and a plurality of clock branches coupled to the clock row; and
   a plurality of circuit blocks coupled to the plurality of clock branches, each circuit block having a clock conversion circuit and a register, wherein the register comprises a flip-flop circuit;
   wherein the clock conversion circuit is programmable to generate clock pulses of an internal clock signal, coupled to the register, having either the first clock frequency or a second frequency that is greater than the first frequency; and
   wherein the clock conversion circuit comprises an exclusive OR gate having a first input coupled to receive the input clock signal and a second input coupled to receive a delayed input clock signal.

2. The circuit of claim 1 further comprising a selection circuit coupled to receive the input clock signal at a first input and an output of the exclusive OR gate at a second input, the selection circuit enabling the register to receive the input clock signal or a pulsed clock signal generated at the output of the exclusive OR gate.

3. The circuit of claim 1 wherein the register comprises a latch circuit.

4. The circuit of claim 3 further comprising an AND gate coupled to receive the input clock signal and the delayed input clock signal.

5. The circuit of claim 4 further comprising a selection circuit coupled to an output of the AND gate and an output of the exclusive OR gate, wherein the selection circuit enables the clock conversion circuit to generate a pulse on both the rising edge and falling edge of the input clock signal.

6. A method of storing data using dual-edge clocking, the method comprising:
   implementing a clock routing network comprising a clock row coupled to receive an input clock signal having a first clock frequency and a plurality of clock branches coupled to the clock row;
   coupling a plurality of circuit blocks to the plurality of clock branches, each circuit block having a clock conversion circuit and a register, wherein the register comprises a flip-flop circuit;
   programming the clock conversion circuit comprises a pulse generator to generate clock pulse of an internal clock signal having either the first clock frequency or a second clock frequency that is greater than the first clock frequency; and
   generating, by the clock conversion circuit, the internal clock signal having either the first clock frequency or the second frequency;
   wherein the clock conversion circuit comprises an exclusive OR gate having a first input coupled to receive the input clock signal and a second input coupled to receive a delayed input clock signal.

7. The method of claim 6 further comprising implementing a selection circuit coupled to receive the input clock signal at a first input and an output of the exclusive OR gate at a second input, the selection circuit enabling the register to be configured to operate as a pulse-controlled register circuit.

8. The method of claim 6 further comprising coupling an AND gate to receive the input clock signal and the delayed input clock signal.

9. The method of claim 8 further comprising coupling a selection circuit to receive an output of the AND gate and an output of the exclusive OR gate, wherein the selection circuit enables the pulse generator to generate a pulse on both the rising edge and falling edge of the input clock signal.

* * * * *